Sept. 11, 1956     M. J. STATEMAN     2,762,967
MAGNETIC LIMITER
Filed March 2, 1953
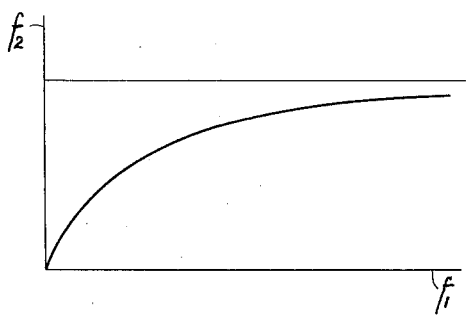
FIG. 1.
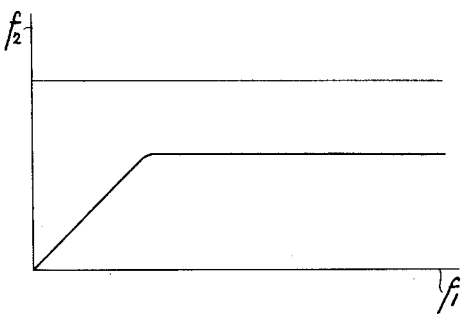
FIG. 2.
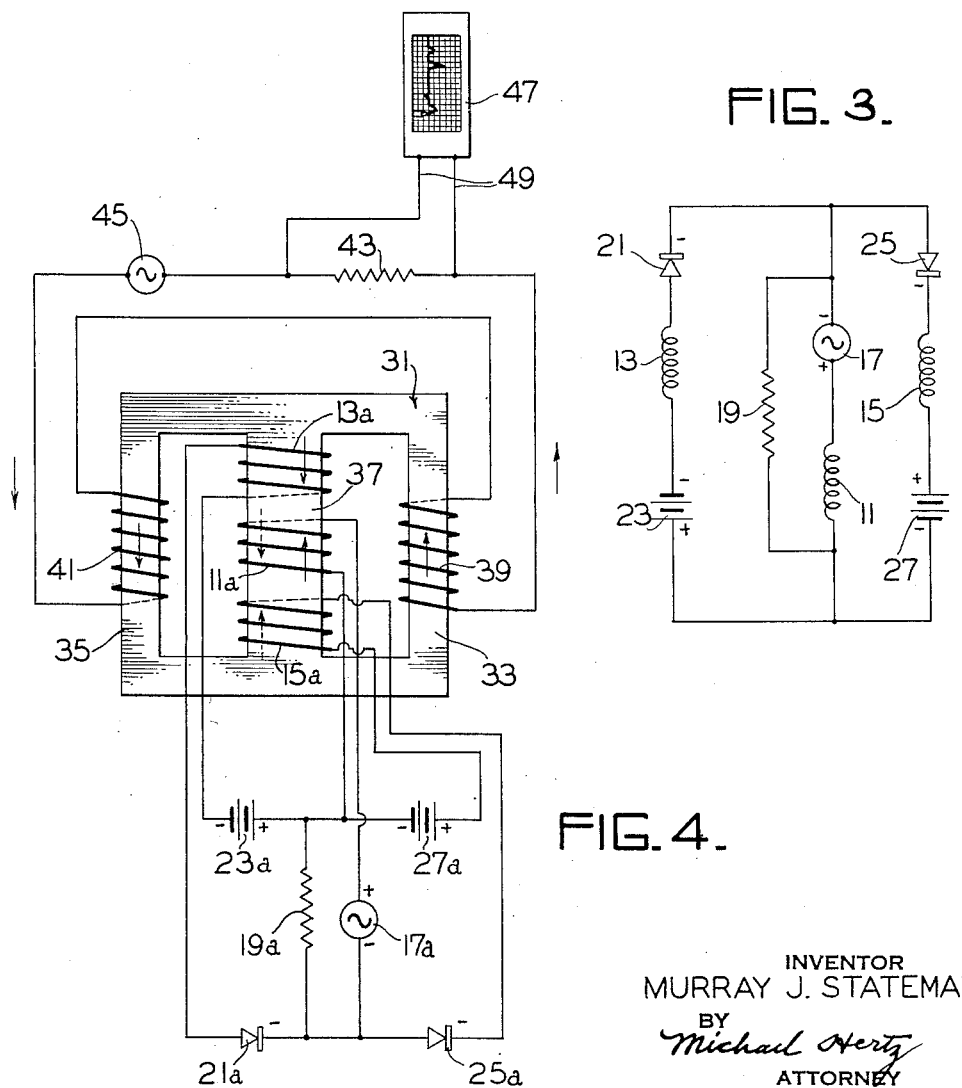
FIG. 3.
FIG. 4.
INVENTOR
MURRAY J. STATEMAN
BY
Michael Hertz
ATTORNEY

United States Patent Office 2,762,967
Patented Sept. 11, 1956

2,762,967
MAGNETIC LIMITER

Murray J. Stateman, Levittown, N. Y., assignor to Sylvania Electric Products Inc., a corporation of Massachusetts Application March 2, 1953, Serial No. 339,793

10 Claims. (Cl. 323—89)

This invention relates to signal magnitude limiting devices. In more particular it relates to the limiting of a control signal when applied to a device having a nonlinear saturable characteristic which may give rise to undesirable results. Such results may ensue when applying a large voltage or current to a rectifier or a saturable reactor. For example, when too large an A. C. voltage is applied to a metallic rectifier, the rectifier will break down; when too great a signal is applied to a saturable reactor so that it reaches a near saturated condition, burn out of coils may take place, as will be hereinafter explained.

The invention is directed to preventing such undesirable consequences in nonlinear devices such as those mentioned above. It is also directed to providing means to counteract the application of too great a signal to the non-linear device to thereby prevent destruction of either the signal applying circuitry or of the circuitry associated with the nonlinear device and controlled by the signal.

In order to clearly set forth this invention, attention is directed to the exemplification thereof and its practical application as described below and as shown in the accompanying drawings in which Fig. 1 shows the typical response curve of a nonlinear element.

Fig. 2 shows the response curve which the application of my invention affords.

Fig. 3 shows my novel signal input circuit.

Fig. 4 shows diagrammatically the application of my signal input circuit to a saturable reactor to control an output circuit associated with the reactor.

In Fig. 1 there is illustrated the response curve of a typical non-linear element. The element for example may be a selenium rectifier and, considering the designation $f$ as a function, $f_1$ may be applied voltage with $f_2$ the resultant current. Or the element may be a saturable reactor with $f_1$ as the current and $f_2$ the resultant flux. In these cases unless there be some special precautions taken, usually at large cost or labor, the resultant curve fails to become level as it approaches the indicated asymptote. In the case of a saturable reactor that means that the flux in the reactor quickly attains a value near the asymptote where reactance of the core rapidly becomes less and less, wherefore the core will have less and less limiting effect on an A. C. current traversed coil associated therewith. It is evident that the current in this coil may reach undesirable high values when the reactor is saturated or nearly saturated.

Now consider Fig. 2. If the controlling function $f_1$ can be cut off sharply at a low level of flux flow through the reactor, regardless of the strength of the applied signal which creates the function $f_2$, then the reactor can not reach a condition where its reactance would be so low as to permit dangerous currents to flow in associated coils.

Such a function creating means is illustrated in Fig. 3. In this figure, 11, 13 and 15 represent three coils which may be inductively coupled. Coil 11 is the main signal coil and coils 13 and 15 are arranged to be alternatively effective to buck the flux developed by coil 11 when it is developing a flux above a certain maximum. Feeding coil 11 is a signal source 17 which may be a D. C. signal source such as a thermocouple or it may be an A. C. signal source. Completing the circuit involving the signal source 17 and coil 11 is the resistance 19. The coil 13 has associated therewith the rectifier unit 21 and the biasing battery 23 with the positive pole of the battery connected to the cathode of the rectifier via the resistance 19 and, in parallel with the resistor, the coil 11 and signal source 17. The coil 15 has associated therewith the rectifier unit 25 and the biasing battery 27 with the negative side of the battery connected to the positive side of the rectifier via the resistor 19 and, in parallel with the resistor, the coil 11 and signal source 17. Should the signal source be D. C. only, then one of the coils 13 or 15 and its associated biasing E. M. F. and rectifier may be eliminated.

In the arrangement shown in Fig. 3, with zero signal, no current flows in any winding since the rectifiers are in opposition to the E. M. F. of both batteries. When the signal voltage is positive, as indicated in Fig. 3, and less than the reference voltage due to battery 23, then no current can flow through the left hand winding 13 since the D. C. reference voltage of battery 23 bucks the signal. The only return path for the signal is through the resistor 19. The same reasoning applies to coil 15 if the signal is negative, or contrary to that shown, and less than the reference voltage of battery 27.

When the voltage developed across the resistance 19 and coil 11 is sufficient to overcome the reference voltage of either battery 23 or battery 27, as the case may be, the associated rectifier 21 or 25 will have current pass therethrough and this current will pass through the coil 13 or coil 15, dependent on the polarity of the signal, thereby creating a flux in opposition to the growing flux due to the increasing current in main signal coil 11; this action places a limit on the maximum effective signal ampere-turns of the signal coil. The windings of all coils are designed to have the same numerical value of ampere-turns, once the bias imposed in the rectifiers have been overcome. The result is that a saturation curve corresponding to Fig. 2 is obtained where the upper portion of the curve is horizontal, rather than sloping toward an asymptote.

In the case of a use of my invention with a reactor, it is intended that this horizontal position shall be well below the saturation level of the reactor and so that the inductor will effectively regulate the current in a coil associated with the reactor.

In Fig. 4 there is illustrated a use of my invention in a signal amplifying transducer. In order to explain the application of my invention, the simple form of controlled circuit is disclosed. In the figure there is illustrated a magnetic core 31 having two outside legs 33 and 35, a central leg 37 and top and bottom side members. Around the two outside legs are wound the two coils or windings 39 and 41, respectively. These windings are series connected and in series with a resistor 43 and A. C. constant voltage energizing source 45. The windings are so connected that at any instant the flux produced in the windings by the signal source 45 will flow in the same direction around the exterior legs and side members of the core. Surrounding the middle leg of the core are the three coils 11a, 13a and 15a corresponding to the three coils 11, 13 and 15 of Fig. 3. Associated with these coils are the circuit elemetns 17a, 19a, 21a, 23a, 25a and 27a corresponding to the same circuit elements without the subscript as described in conjunction with Fig. 3.

The coils 13a and 15a are so wound that the flux through these coils, whenever current is flowing through them will buck the excess flux at that instant generated by the coil 11a. Under normal signal deviations, the voltage across the coil 11a is insufficient to overcome the bias on the rectifier 21a or 25a whereby the coils 13a and 15a are dormant. As the result the flux in the core 31 of the reactor is influenced by the signal so as to change the magnetization of the reactor and thereby enable the same to control the flow of current through the coils 39 and 41 and thereby change the potential drop across the resistor 43. Under excess signal strength, however, the coil 13a or 15a will be energized to create a flux opposing the flux created by coil 11a which is in excess of that due to signals of normal strength thereby inhibiting saturation of the reactor with attendant evil results. Obviously were it permitted for the coil 11a to saturate or nearly saturate the reactor, the impedance of the output circuit would be low and excessive currents would then flow in the controlled circuit with possible damage to components in the circuit.

The varying current flow in the coils 39 and 41 causes a varying potential drop across resistor 43, which can be measured and recorded by any suitable mechanism, as a recorder 47 having potential leads 49 across the resistor.

Having thus described my invention, what I claim as new is:

1. A signal circuit for association with a controlled device displaying a nonlinear saturable characteristic comprising a signal source, means forming a closed circuit therewith including an inductive element fed by said source, a second inductive element in parallel with said first inductive element and magnetically linked therewith, a rectifier in series with said second inductive element to limit flow of current therethrough so that it flows in one direction only, and means biasing said second inductive element to inhibit flow of current therethrough below a set potential all in combination with an alternating current load circuit including a winding magnetically linked with the device.

2. A signal circuit for association with a controlled device displaying a nonlinear saturable characteristic comprising a signal source, an inductive element fed by said source, a second inductive element in parallel with said first inductive element and magnetically linked therewith, means forming a closed circuit therewith including a rectifier in series with said second inductive element to limit flow of current therethrough so that it flows in one direction only, and a source of D. C. potential biasing said second inductive element to inhibit flow of current therethrough below a set potential all in combination with an alternating current load circuit including a winding magnetically linked with the device.

3. A signal circuit for association with a controlled device displaying a nonlinear saturable characteristic comprising a signal source, means forming a closed circuit therewith including an inductive element fed by said source, a second inductive element having in series therewith a rectifier and a source of D. C. potential, the three serially connected elements being in parallel with the first inductive element and with the inductive elements magnetically coupled with each other, the D. C. source having its poles so connected to the terminals of the rectifier as to impose a bias on the rectifier all in combination with an alternating current load circuit including a winding magnetically linked with the device.

4. A signal circuit for association with a controlled device displaying a nonlinear saturable characteristic comprising a signal source, an inductive element fed by said source, a resistance in series with said source and inductive element closing the circuit, a second inductive element in parallel with said first inductive element and magnetically linked therewith, a rectifier in series with said second inductive element to limit flow of current therethrough so that it flows in one direction only, and a source of D. C. potential biasing said second inductive element to inhibit flow of current therethrough below a set potential all in combination with an alternating current load circuit including a winding magnetically linked with the device.

5. A signal circuit for association with a controlled device displaying a nonlinear saturable characteristic comprising an A. C. signal source, means forming a closed circuit therewith including an inductive element fed by said source, a pair of inductive elements in parallel and magnetically linked relation with said first inductive element and with each other, means operative in conjunction with each of said pair of inductive elements to limit flow of current therethrough to flow in one direction only, and means biasing each of said pair of inductive elements to inhibit flow therethrough below a set potential all in combination with an alternating current load circuit including a winding magnetically linked with the device.

6. A signal circuit for association with a controlled device displaying a nonlinear saturable characteristic comprising an A. C. signal source, means forming a closed circuit therewith including an inductive element fed by said source, a pair of inductive elements in parallel and magnetically linked relation with said first inductive element and with each other, a crystal rectifier operative in conjunction with each of said pair of inductive elements to limit flow of current therethrough to flow in one direction only, and means biasing each of said pair of inductive elements to inhibit flow therethrough below a set potential, said rectifiers being so connected that the negative pole of one is connected to one pole of the signal source and the positive pole of the other is connected to the same pole of the signal source all in combination with an alternating current load circuit including a winding magnetically linked with the device.

7. A signal circuit for association with a controlled device displaying a nonlinear saturable characteristic comprising an A. C. signal source, means forming a closed circuit therewith including an inductive element fed by said source, a pair of inductive elements in parallel and magnetically linked relation with said first inductive element and with each other, a crystal rectifier operative in conjunction with each of said pair of inductive elements to limit flow of current therethrough to flow in one direction only, and means biasing each of said pair of inductive elements to inhibit flow therethrough below a set potential, said rectifiers being so connected that the negative pole of one is connected to one pole of the signal source and the positive pole of the other is connected to the same pole of the signal source, and means comprising a source of D. C. potential biasing each of said pair of inductive elements to inhibit flow therethrough below a set potential, the D. C. source for each of the inductive elements of the pair having its poles so arranged as to oppose the flow of current through the crystals until the signal E. M. F. is greater than the counter E. M. F. of the D. C. source all in combination with an alternating current load circuit including a winding magnetically linked with the device.

8. A transducer comprising a magnetic core, an output circuit including a winding magnetically linked with said core and means for passing an alternating current through the winding, means for varying the flux through the core to a limit less than saturation including a signal coil magnetically linked with the core and a second coil surrounding the core, the signal coil and signal source being in series relation with each other and the second coil being in parallel relation to the series connected signal source and signal coil, means in series with the second coil to inhibit flow of current in that coil except in one direction, and means biasing said flow inhibiting means to restrict any flow therethrough except when above the potential of said biasing means, the signal coil and second coil being wound in such directions as to produce opposing fluxes when current does flow in said second coil.

9. A transducer comprising a magnetic core, an output circuit including a winding magnetically linked with said core and means for passing an alternating current through the winding, means for varying the flux through the core to a limit less than saturation including a signal coil having an A. C. signal source magnetically linked with the core, a second coil and a third coil also magnetically linked with the core, means individual to each of said second and third coils to restrict current flow through the coils so that it flows in one direction only and only when the potential is above a set limit, the connections between the second and third coils, their direction of winding and their restricting means being such as to cause these coils when energized to build up a flux opposing the flux of the signal coil when the signal in the signal coil exceeds the set limit, to thereby prevent further addition of flux in the core and such as to markedly decrease the reactance of the transducer.

10. A transducer comprising a three legged core, series connected windings on the outer legs, a metering circuit including said windings, a constant voltage A. C. source and a load, and a control circuit for said metering circuit comprising three coils surrounding the intermediate leg, one coil having in series therewith, at one end, an A. C. signal source of varying amplitude and a resistor, a second coil having in series therewith at one end a rectifier with its cathode connected to one end of the signal source and having in series therewith at its other end a source of D. C. potential with its negative end connected to the coil and its positive end connected to the second end of the signal coil, and the third coil having in series therewith at one end a rectifier whose anode is connected to the said end of the signal source and having in series therewith at its other end a source of D. C. potential with its positive end connected to the coil and its negative end connected to the second end of the signal coil.

References Cited in the file of this patent

UNITED STATES PATENTS

| 1,981,921 | Logan | Nov. 27, 1934 |
| 2,331,411 | Milarta | Oct. 12, 1943 |

FOREIGN PATENTS

| 712,809 | Germany | Oct. 25, 1941 |